June 19, 1956  R. K. SUPER ET AL  2,751,048
TRANSVERSELY EXPANDING WHEEL BRAKE
Filed Sept. 12, 1952  6 Sheets-Sheet 6

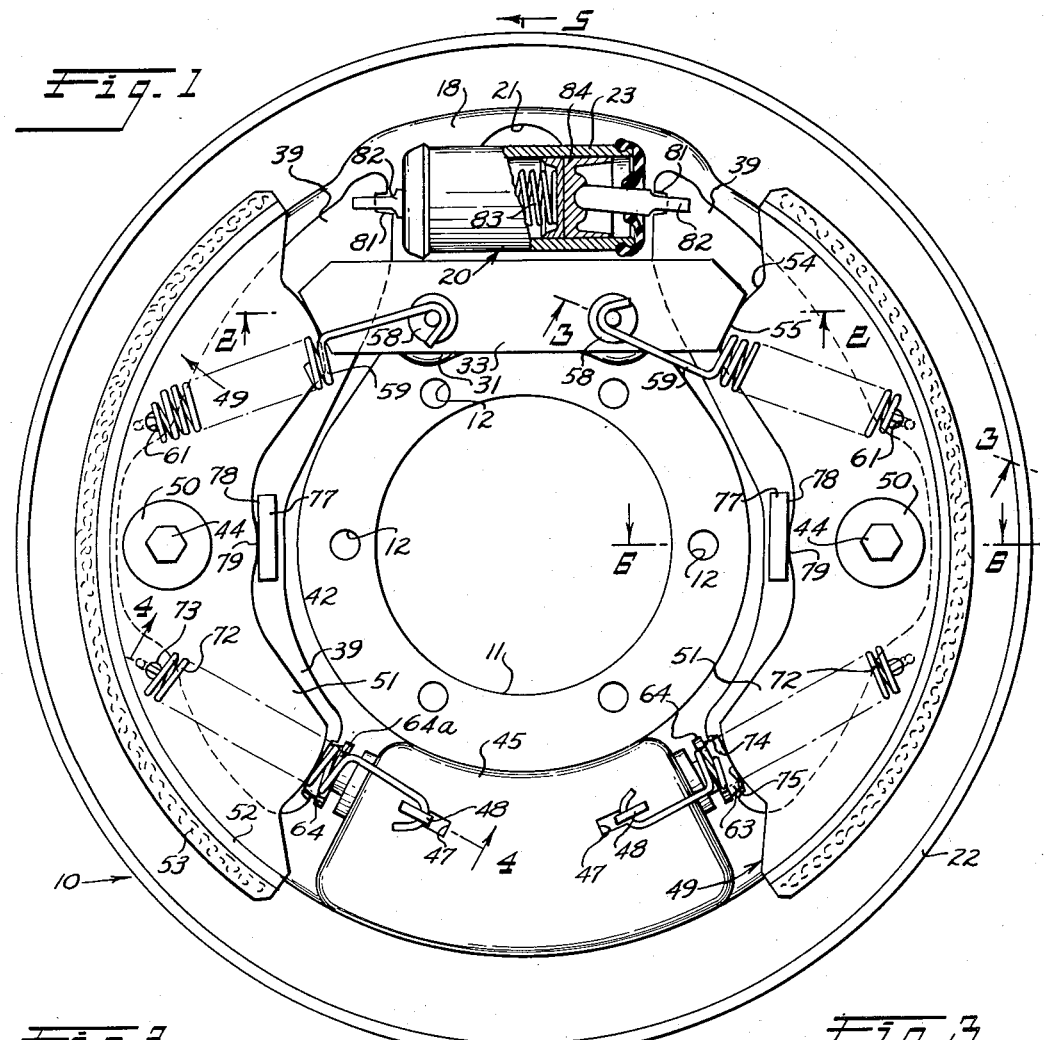
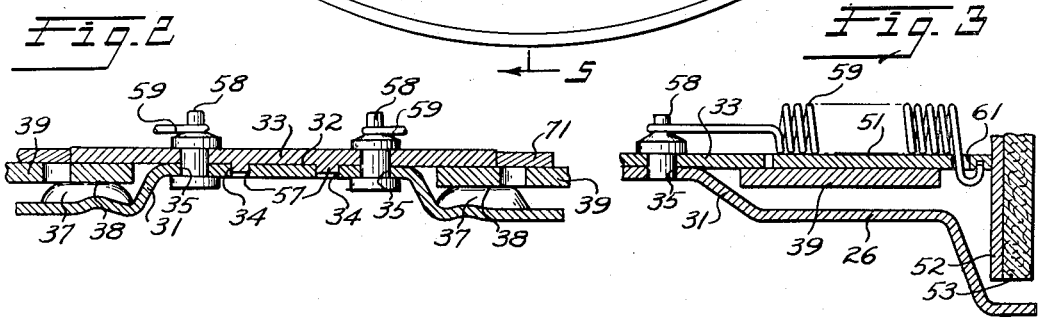
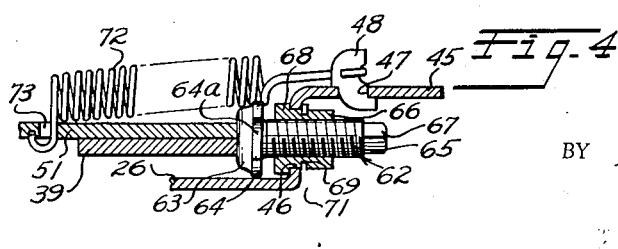

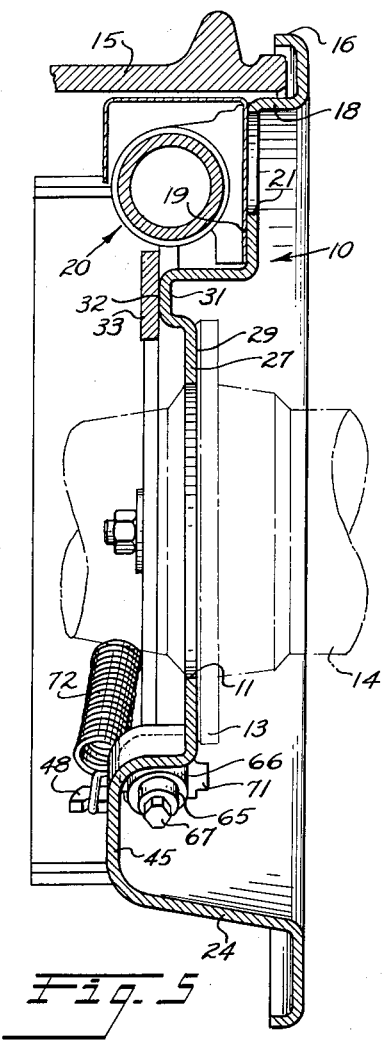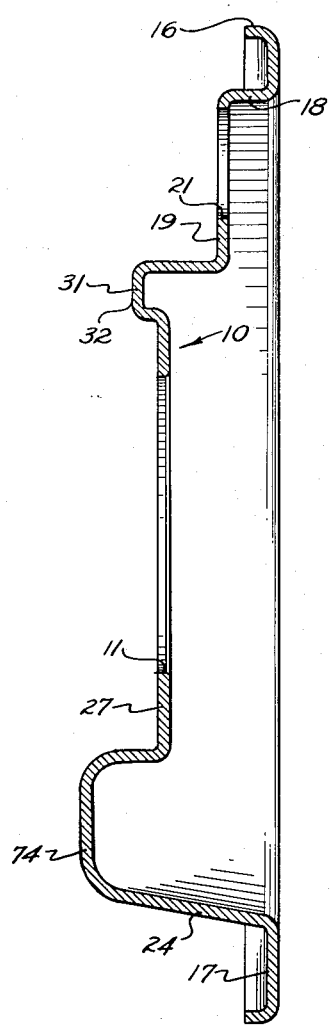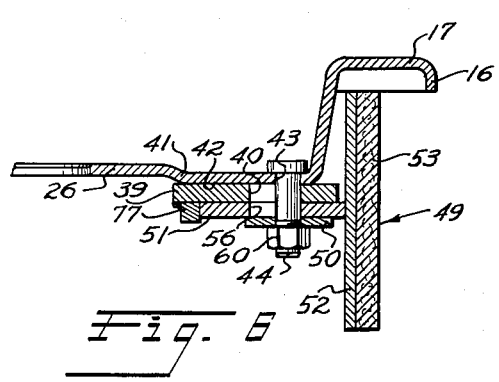

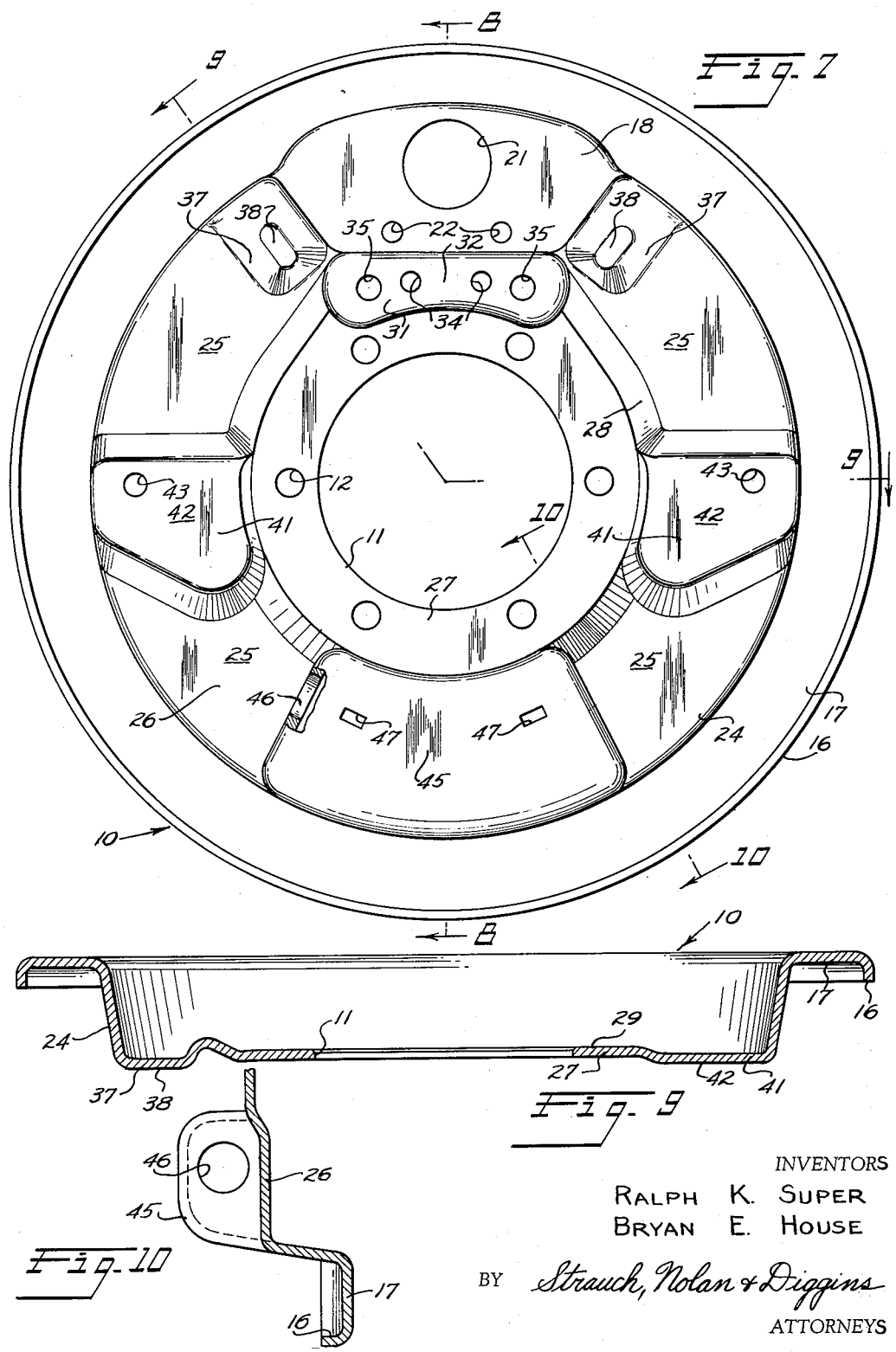

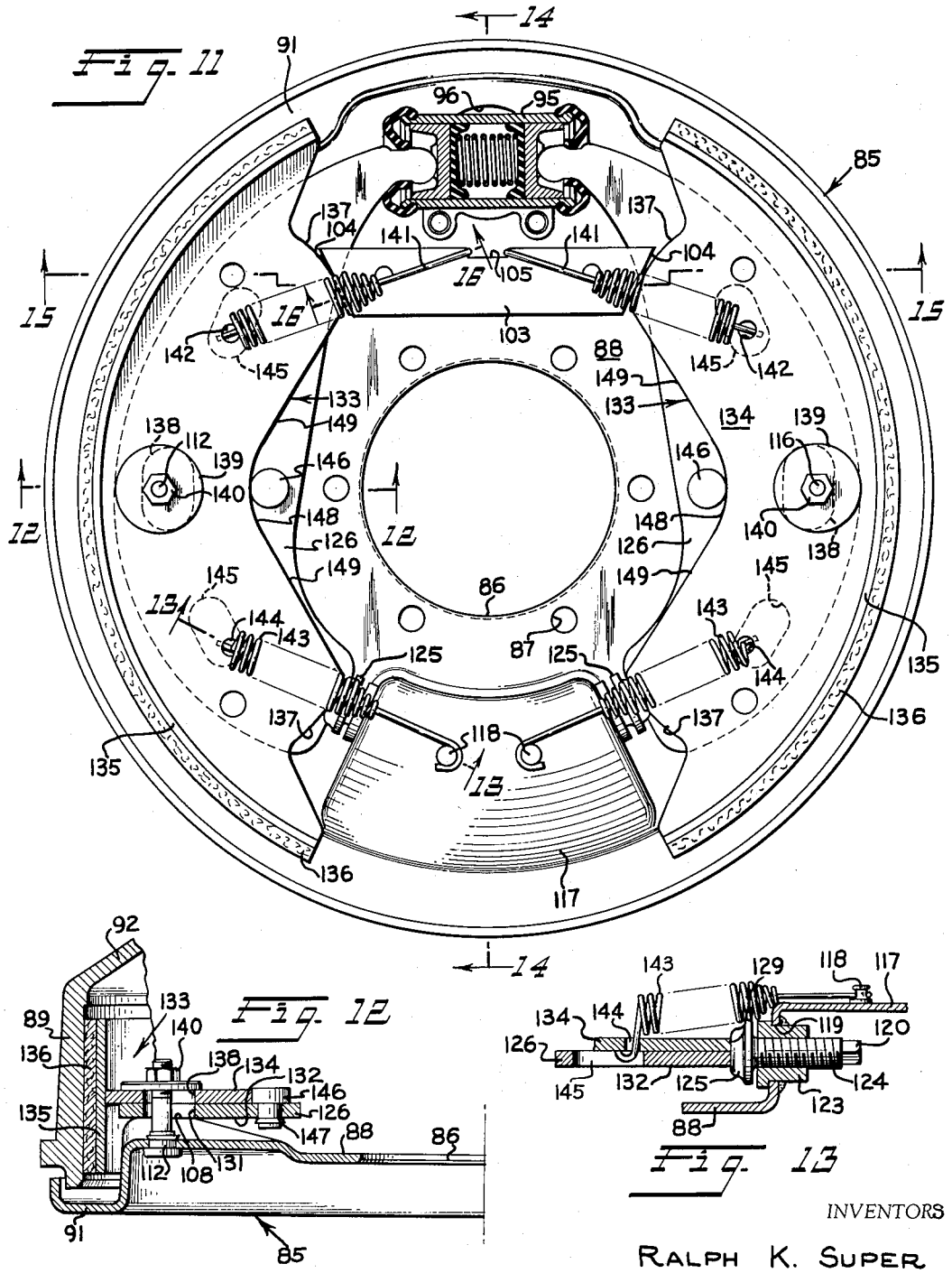

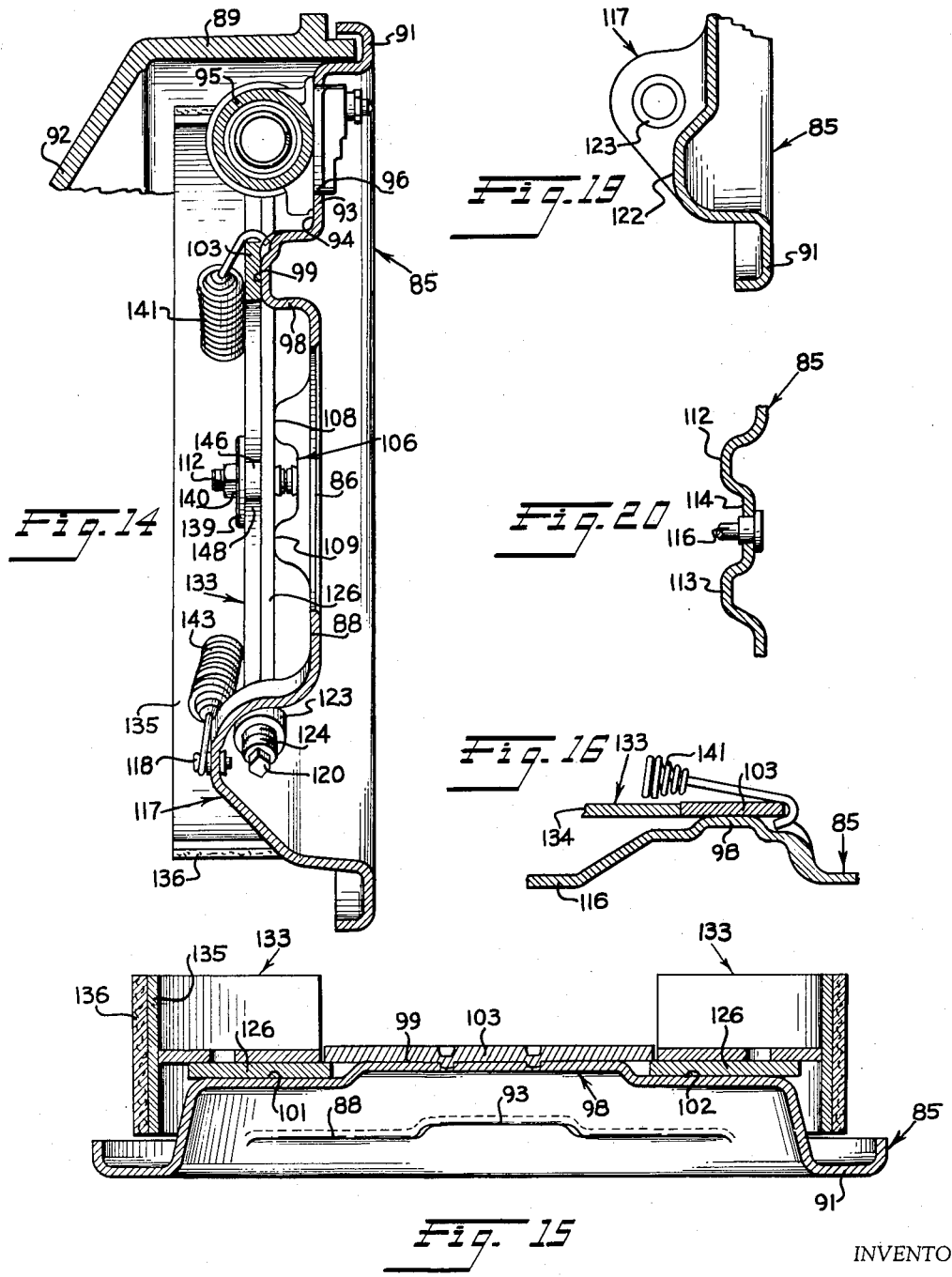

INVENTORS
RALPH K. SUPER
BRYAN E. HOUSE
BY Strauch, Nolan + Diggins
ATTORNEYS

United States Patent Office 2,751,048
Patented June 19, 1956

---

2,751,048

TRANSVERSELY EXPANDING WHEEL BRAKE

Ralph K. Super and Bryan E. House, Ashtabula, Ohio, assignors, by mesne assignments, to Rockwell Spring and Axle Company, Coraopolis, Pa., a corporation of Pennsylvania Application September 12, 1952, Serial No. 309,204

26 Claims. (Cl. 188—78)

This invention relates to improvements in vehicle brakes and has particular reference to an improved brake mechanism of the general type wherein the brake shoes are slidably and rockably connected to a pivoted actuating lever. This is a continuation-in-part of our application for United States Letters Patent S. N. 243,952, filed August 28, 1951, now abandoned.

While brakes of this type have proved to be highly satisfactory in operation and the operative principles have been successfully employed, certain practical problems have arisen in connection with their production and operation the solution to which are among the objects of the present invention. More specifically the present invention contemplates the provision of improved means for supporting the brake shoes, actuating levers, and shoe expanding means, novel brake shoe and lever arrangements, self-energizing shoe and lever connections, and improved brake shoe adjusting means that is simple and comparatively easy to effect.

One of the important problems was to find some means of centering a floating shoe which keeps it properly aligned and prevents it from cocking during actuation. Generally when a brake is applied, after the brake first starts acting, to increase the braking action the brake pedal has to be depressed further with additional fluid or actuation travel. The present invention provides in one phase a new pressure pin and recessed shoe web edge connection embodying a ramp or wedge effect, with a side of the recess riding up on the pressure pin upon contact of the brake shoe with the drum and the accompanying shoe displacement in the direction of rotation of the drum, and this gives a self-energizing effect with increased shoe energization. This ramp or wedge effect in addition to increasing shoe energization tends to compensate for lining-drum clearance and thereby holds fluid or actuator travel requirements to a minimum.

It is therefore the major object of the invention to provide a novel brake mechanism which is inexpensive and easy to manufacture and assemble and embodies strikingly novel and efficient relations between the various parts.

Another object of this invention is to provide a novel brake mechanism support plate that is simply and completely fabricated as by stamping a sheet metal blank and requires no additional manufacturing operations such as drilling and welding.

Another object of the invention is to provide a novel brake mechanism support plate whereon the adjusting mechanism is mounted in such a manner that all necessary adjustment may be made from outside the plate and which requires no special aperture in the plate to reach the adjustment mechanism.

Still another object of the invention is to provide for novel alignment of the brake shoes and levers by plane surfaces or pads on the brake mechanism support plate to positively position and guide the levers.

A still further object of the invention resides in the provision of an improved brake mechanism of the character indicated of such compact arrangement that brakes of adequate size and capacity may be fitted into the limited space available on heavy duty vehicles.

It is another object of this invention to provide novel equalizing coupling means between the brake levers and the actuating means therefor to insure the equal transmission of braking forces through said levers to the respective brake shoes.

A further object of the invention is to provide a novel self-energizing action in the connection between the brake shoe and the actuating lever. This automatically compensates for lining-drum clearance and provides an automatic take-up for lining wear, thereby minimizing fluid or actuator travel requirements, insuring against pedal flooring and increasing the time between needed brake adjustments.

Another object of the invention lies in providing a special concave surface and fixed pin connection between the brake shoe web and the actuating lever, giving a ramp or wedge effect due to a side of the concave surface riding up on the fixed pressure pin and thereby tending to increase shoe energization.

It is a further object of this invention to provide a special connection between the brake shoe web and the actuating lever embodying a shoe surface in the form of a concave arc having a diameter in the range of two-three inches bearing against a fixed smaller round pressure pin having a diameter in the range of about three-fourths inches on the actuating lever which tends to center the floating shoe, or a connection with similar relative dimensions.

An improved brake mechanism of the character indicated is provided that may be readily adapted to hydraulic, pneumatic or cam operation.

Further objects of the invention will become apparent as the specification proceeds in conjunction with the annexed drawings in which like reference numerals are used to designate similar parts throughout, and from the appended claims.

In the drawings:

Figure 1 is an end view partially broken away and partially in section of the improved brake mechanism with the brake drum removed, according to one embodiment of the invention.

Figure 2 is a section along the line 2—2 of Figure 1, illustrating the upper abutment plate structure.

Figure 3 is a section on line 3—3 of Figure 1, further illustrating the abutment plate and lever coaction.

Figure 4 is a section along the line 4—4 of Figure 1, illustrating the lower abutment structure.

Figure 5 is a diametral section along line 5—5 of Figure 1.

Figure 6 is a section along line 6—6 of Figure 1, illustrating the lever shoe guide structure.

Figure 7 is an elevational view of the brake mechanism support plate of Figure 1 with the brake mechanism removed.

Figure 8 is a diametral section along line 8—8 of Figure 7.

Figure 9 is a section along line 9—9 of Figure 7.

Figure 10 is a section along line 10—10 of Figure 7.

Figure 11 is an end view partially in section of an improved brake mechanism according to a preferred embodiment of the invention.

Figure 12 is a section along the line 12—12 of Figure 11, illustrating the shoe and lever connection.

Figure 13 is a section along the line 13—13 of Figure 11, illustrating the lower abutment structure.

Figure 14 is a diametral section along the line 14—14 of Figure 11.

Figure 15 is a sectional view along the line 15—15 of Figure 11, illustrating the upper abutment plate structure.

Figure 16 is a section along the line 16—16 of Figure 11, illustrating the upper abutment connection.

Figure 19 is a fragmentary section on line 19—19 of Figure 17 illustrating the end of the lower abutment support boss.

Figure 20 is a fragmentary section on line 20—20 of Figure 17 illustrating the intermediate lever support boss contour.

Figure 17:
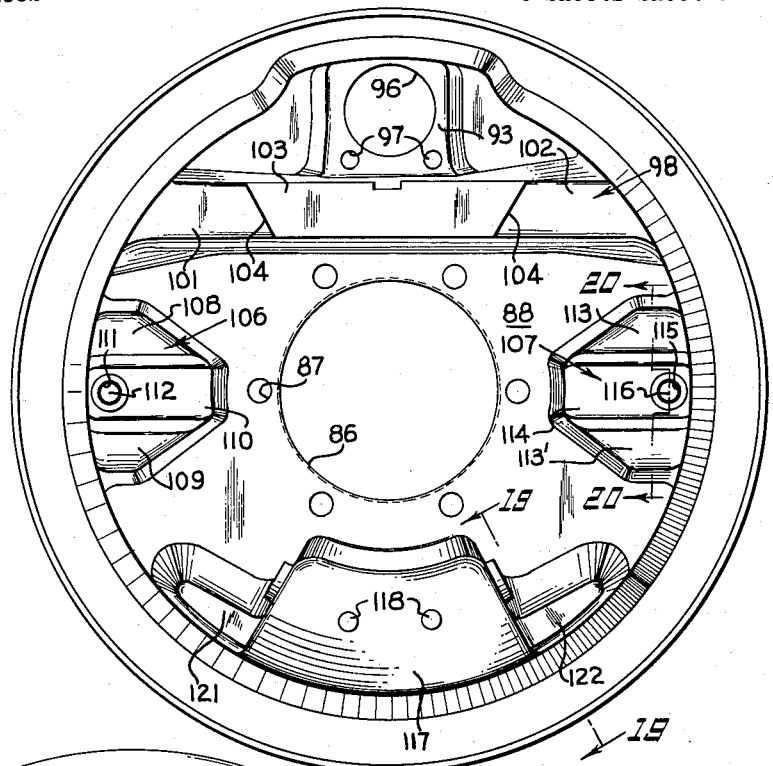
Figure 17 and 18 are opposite end views of the backing plate of Figure 11.
Figure 18:
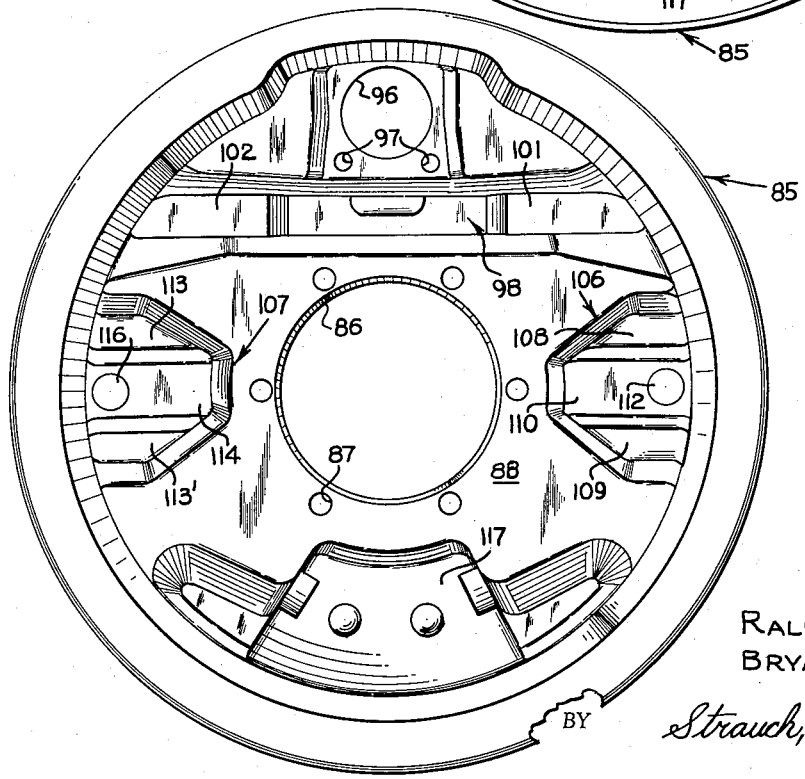

With continued reference to the drawings the numeral 10 generally indicates a brake mechanism support member or backing plate on which are mounted the movable parts of the brake mechanism. This support member is preferably an integral steel stamping drawn and punched during fabrication so as to require no further machining operations during installation. Support member 10 has a central aperture 11 through which a portion of the vehicle axle housing projects and is provided around this central aperture with apertures 12 through which extend rivets or bolts, not illustrated, to rigidly secure the plate 10 to a flange 13 (Figure 5) on the axle housing 14, in a manner known to the art. A cylindrical wheel mounted brake drum, partially indicated at 15 in Figure 5, has its open end substantially closed by the plate 10, and drum 15 is rotatable with respect to plate 10. Brake mechanism support 10 is formed about its outer periphery with a cylindrical dirt and dust excluding lip 16 that overlaps the inner edge of the brake drum 15 (Figure 5).

The improved backing plate 10 serves as a base for the brake mechanism mounted on it, being formed with integral angularly spaced bosses or lugs to support and guide the brake mechanism. Inwardly of lip 16, a substantially annular recess 17 extends entirely around the plate. At the top of plate 10, a shallow boss 18 is formed projecting axially outwardly in the direction of the brake drum and (Figures 5 and 8) having a flat radial surface 19 thereon for mounting the hydraulic wheel brake cylinder 20. Boss 18 is formed with an aperture 21 through which projects the support and fluid supply connection for cylinder 20, and with aperatures 22 which mate with tapped holes (not shown) in the base of the body 23 of cylinder 20 and through which screws or bolts (not shown) are inserted to rigidly hold cylinder 20 in position. A truncated conical wall 24 (Figure 8) extends axially outwardly from the inner periphery of annular recess 17, except where interrupted by the cylinder mounting boss 18, said conical wall 24 intersecting generally with a radial flat surface 25 of web 26 which lies in a plane perpendicular to the axis of the backing plate 10, except where the web is interrupted by the brake cylinder mounting boss and a series of other bosses later described.

A continuous annular flat radial flange 27 parallel to but displaced a small distance outwardly from web 26 is formed with apertures 11 and 12 and is connected to web 26 by inclined walls 28 except where interrupted by several raised bosses as will appear. The flat face 29 of flange 27 coacts with the adjacent flat radial face of axle flange 13 to accurately axially locate the plate 10 and associated braking mechanism on the axle housing.

Radially inwardly of boss 18, the plate is formed with an outwardly projecting boss or pad 31 having a flat radial surface 32 that is disposed at right angles to the axis of plate 10 and upon which is mounted a flat abutment plate 33 later described in detail. Surface 32 is located axially outwardly of web surface 25. Pad 31 is formed with pairs of apertures 34 and 35 respectively, the purpose of which will appear.

At the opposite ends of boss 31, two bosses 37 rise from surface 25 and have flat radial surfaces 38 parallel to and disposed axially outward of surface 25, but axially inward of surface 32. Bosses 37 serve as guides for the brake levers 39 and cooperate with abutment plate 33 to maintain the alignment of levers 39, said levers 39 being slidably confined between abutment plate 33 and the flat surfaces of bosses 37, as shown in Figure 2 and as will be described in further detail.

Projecting axially outwardly from web 26 are two diametrically opposite bosses or pads 41 having flat radial surfaces 42 lying in the same plane as surfaces 38 of bosses 37. Apertures 43 are formed in bosses 41 to receive the guide bolts 44 whose purpose will be explained later.

The integral brake backing plate and support member 10 is essentially symmetrical about the vertical center line generally indicated as line 5—5 in Figure 1. At the bottom of the plate 10, projecting axially outwardly from web 26 and located radially between flange 27 and the annular peripheral recess 17 is an interiorly open sector-shaped boss or dome 45 having end apertures 46 through which the adjusting mechanism for the brake shoes passes. As will appear this permits adjustment of the brakes from behind the backing plate 10, or to the right thereof as viewed in Figure 5. No entry is required through the backing plate which may remain sealed during adjustment, and apertures 46 are closed by the brake adjusting mechanism later described in detail. Two rectangular slots 47 are provided in dome 45 in which are mounted a pair of return spring clips 48.

The plate 10 is made by drawing and punching a single blank of metal in operations wherein the various surfaces 32, 38 and 42 are correctly formed and relatively located without subsequent machine operations.

The brake mechanism broadly comprises a pair of brake shoes 49 mounted for movement toward and away from the inner cylindrical surface of brake drum 15, each brake shoe being actuated by one of the levers 39, which levers in turn are simultaneously oppositely actuated by any suitable form of mechanism, such as the illustrated hydraulic cylinder or by pneumatic or manual actuators.

The brake shoes may be of any desired construction, but in the illustrated embodiment each embodies a flat radial web 51 and an integral arcuate platform 52 having brake lining 53 secured to its outer surface in any suitable manner, as for instance by rivets or the like and which may be applied in two or more sections. The web 51 of each shoe is provided at its upper end edge with an arcuate abutment face 54 which cooperates with a straight flat edge 55 on the adjacent end of abutment plate 33 to limit the radially inward movement of the upper end of the shoe. A similar arcuate abutment face is formed on the lower end edge of web 51. An enlarged aperature 56 (Figure 6) is provided in each brake shoe web 51 through which freely passes one of the bolts 44, and apertures 56 are diametrically oppositely disposed in the assembly.

The upper abutment plate 33 is made of simple flat metal stock and is located on pad 31 as by projecting integral lugs 57 received in apertures 34 of pad 31. Plate 33 is rigidly secured to backing plate 10 by combination pin posts and rivets 58. Riverts 58 also anchor one end of each of a pair of upper return springs 59. Each spring 59 is anchored at its other end in an opening 61 in a brake shoe web 51. Each spring 59 acts to hold upper abutment surface 54 of a brake web 51 against an edge 55 of abutment plate 33, in the non-actuated position of Figure 1, and cooperates with pad 37 to maintain the brake shoe 49 and the lever 39 in alignment.

Each lower abutment member 62 is in the form of a screw having a flat head 63 outside of dome 45 which serves as a fulcrum for the lower end of a lever 39. Each member 62 is provided with an enlarged flange 64 arcuately escalloped at 64a and a threaded body 65 passing through an internally threaded support bushing 66 mounted in an aperture 46 of dome 45 and terminating in a hexagonal or other non-circular section 67 inside dome 45 and thereby outside the brake assembly for engagement by a wrench. Abutment members 62 project at equal angles with respect to the vertical centerline of the assembly. In the illustrated embodiment, each bushing 66 has an enlarged collar 68 which seats around the outer edge of aperture 46 and a groove 69 inside dome 45 into which fits a non-rotatable snap ring 71, for securing the bushing non-rotatably on dome 45. Snap ring 71 is of suitable outer conformation that it will engage part of the plate 10 to prevent rotation of the ring when the bolt 62 is rotated. If preferred, bushing 66 may be welded or otherwise non-rotatably fixed within aperture 46.

A lower return spring 72 is secured at one end in an opening 73 in web 51 of each brake shoe and anchored at the other end to bracket 48 that is fixed on dome 45. Each of these springs 72 passes through and nests in one of the escalloped sections 64a of a screw flange 64 (Figure 4). These springs primarily act to hold the associated lower brake shoe abutment faces 54, which are the same as the upper faces 54 in contact with edges 55, in contact with the flat ends of lower abutment members 62. By a wrench applied to hexagonal section 67, the threaded body 65 may be rotated and thereby moved axially through bushing 66 to effect adjustment of the brake shoe in the plane of shoe movement. Each shoe, their respective mechanisms being identical and symmetrical about the vertical centerline, may be adjusted independently of the other. The nesting of each spring 72 in one of the four or more notches 64a of flange 64 provides a flexible indexing and locking means for each abutment screw 62.

Brake levers 39 are each flat sided metal plates disposed between a brake shoe web 51 and brake backing plate 10. Each lever has a central aperture 40 of the same size as aperture 56.

As shown in Figure 6, apertures 40 and 56 are enough larger than bolt 44 to permit free movement of the lever and brake shoe relative to each other and the bolt, and a washer 50 held on the bolt by nut 60 is larger than these apertures, so that surface 42 and the flat sided washer 50 function to slidably retain and guide the shoe and lever assembly in operation. Each lever 39 is provided with an end recess 74 (Figure 1) and curved edge 75 shaped like web surface 54 on the lower pivot ends. Each recess 74 partially encloses a lower abutment member head 63 for the purpose of maintaining its position thereon and the curved edge 75 at the bottom of the recess has substantially a point contact with the flat head of abutment member 62 and thereby provides a pivot point thereon.

Center pressure plates 77 are rigidly secured to levers 39 adjacent their mid-length and have flat surfaces 78, each bearing on a rounded projection 79 on the associated brake shoe web. The opposite ends of levers 39 are formed with slots 81 to receive the bifurcated ends of piston rods 82. For the purpose of disclosure of the invention, a hydraulic actuator 20 is illustrated comprising body cylinder 23 which contains a coiled spring 83, pistons 84 and piston rods 82.

In the static non-operative position of the brake mechanism illustrated in Figure 1, the coiled piston spring 83, being partially compressed in the assembly, acts through pistons 84 and piston rods 82 to tend to rock each lever 39 oppositely on its lower pivot surface or curved edge 75 on the lower abutment member 62. This force is balanced by the reaction of pressure plate 77 on the projection 79 of each brake shoe web 51. The webs 51 are held tightly against the ends of abutment plate 33 and the abutment members 62 by the return springs 59 and 72. The lines of action of the return springs 59 and 72 are substantially the same in both directions and in a line approximating the direction of the braking forces on the abutting surfaces, hence there is no need for delicately balancing the springs so as to maintain alignment of the brake shoes.

In the operation of the brakes, fluid under pressure is selectively introduced into the central space of cylinder 23 to cause outward displacement of piston rods 82 and opposite rocking of levers 39. This causes the levers 39 to fulcrum on lower abutments 62 and the force due to the fluid pressure is multiplied by levers 39 and is transmitted through pressure plates 77 to each brake shoe, thereby moving each brake shoe radially outwardly against the reaction of springs 59 and 72 away from the end abutments 33 and 62 and into contact with brake drum 15. During outward movement the levers 39 are guided and retained in substantially planar movement by surfaces 38 and 42 and plate 33 and the cooperating bolt and washer assembly at 44, 50.

Pressure plates 77 roll relatively to the rounded edges 79 of the brake shoes, thereby automatically maintaining a balanced transmission of force. The brake shoes, each being a freely floating member, will rock and tend to slide slightly on surfaces 78 in the direction of rotation of the brake drum, thereby maintaining solid contact with one of the other of the abutment members, depending upon the direction of rotation of the drum. The braking force torque is thereby transmitted from the brake shoe through one of the abutment members to the backing plate and thence to the axle housing. Each bolt 44, while maintaining alignment and assembly of the associated lever and brake shoe, will freely permit this desired rocking because apertures 40 and 56 are much larger than the bolt. This rocking allows the entire braking surface of the brake lining to automatically center itself and contact the brake drum surface, permitting even wear during braking. When the fluid pressure is released, the return springs react to restore the mechanism to its original static condition with the shoes bearing against the abutment surfaces.

The lines of action of springs 59 intersect on the vertical centerline of the brake, as do the lines of action of springs 72, so that the assembly is always symmetrical and balanced in operation.

It will be noted from Figure 6 that each pressure plate 77 is welded or otherwise permanently fixed to the outer side of a lever 39 whose inner side is slidable on the plate 10. The disclosed novel manner of actuating the brake shoe eliminates the need for two parallel levers straddling and bridging the brake shoe web such as in the mechanism shown in U. S. Patent No. 2,435,955 to Buckendale, et al., and provides a brake mechanism that is comparatively lighter, simpler and more economical to manufacture and service. Preferably bolts 44 are located diametrically opposite and when the parts are at rest as in Figure 1, surfaces 78 are parallel to each other and perpendicular to the diameter through bolts 44.

With reference to Figures 11-20 of the drawings, the numeral 85 generally indicates a brake mechanism support member or backing plate on which are mounted the movable parts of the brake mechanism. This support member is also an integral steel stamping which may be drawn and punched during fabrication so as to require no further machining operations during installation. Support member 85 has a central aperture 86 through which a portion of the vehicle axle housing projects and is provided around this central aperture with apertures 87 through which extend rivets or bolts, not illustrated, to rigidly secure the backing plate 85 to the axle housing, not shown.

Apertures 86 and 87 pass through a continuous annular flat radial flange 88 of backing plate 85. A cylindrical wheel mounted brake drum 89 has its open end substantially closed by, and is rotatable with respect to, the plate 85 which is formed about its outer periphery with a cylindrical dirt and dust excluding lip 91 that overlaps the inner edge of the brake drum 89. The other end of drum 89 is completely closed by drum mounting wheel flange 92.

At the top of backing plate 85, a shallow boss 93 is formed projecting axially outward and having a flat radial surface 94 parallel to and radially outward from flange 88, for mounting the hydraulic wheel brake cylinder 95. There is an aperture 96 and apertures 97 through which project the fluid supply connection and the supports for cylinder 95.

Radially inwardly of boss 93, flange 88 is traversed by a straight axially outwardly projecting boss 98 having a flat central face 99 that is higher than two flat end faces 101 and 102 disposed at a lower level.

An upper abutment plate 103 which is a single length of flat steel stock formed with a spring attachment notch 105 and having oppositely inclined flat edge surfaces 104 is rigidly mounted on boss 98 on face 99 as illustrated in Figure 15. Preferably plate 103 is welded to boss 98 so as to form a permanent substantially integral part. Fixed surfaces 104 are disposed at equal angles with respect to the vertical and positively limit the inner travel of the brake shoe actuating levers as will appear.

With reference to Figure 17, the backing plate is formed with two axially projecting similar diametrically opposite bosses 106 and 107. Boss 106 comprises high portions topped by flat lever guide faces 108 and 109 spaced by a central depressed region 110 apertured at 111 to accommodate a guide bolt 112 which is welded or otherwise permanently fixed to the backing plate. Similarly boss 107 comprises high portions topped by flat lever guide faces 113 and 113' spaced by a central depressed region 114 apertured at 115 to accommodate a guide bolt 116 welded or otherwise permanently affixed to the backing plate.

At the bottom of backing plate 85 is a hollow boss 117 which extends axially outwardly from flange 88 and is open inwardly. Two spring anchor pins 118 project from the top of this boss end apertures 119 are provided through which extend the adjusting mechanism for the brake shoes. At opposite ends (Figure 17) boss 117 is provided with extensions whose flat top surfaces 121 and 122 are disposed at the same level as the lever guide faces.

Referring to Figure 13, an internally threaded support bushing 123 is fixed in each aperture 119 as by welding. Each lower abutment member 124 is screw threaded in bushing 123 with a flat head 125 externally of the boss and a non-circular wrench gripping section 120 within boss 117.

At opposite sides of the brake assembly identical actuating levers 126 extend between lower abutment heads 125 and the actuating cylinder 95. At its lower end each lever 126 is formed to rock on flat face 129 of the lower abutment head in the same manner that levers 39 rock in the lower abutments in the embodiment of Figure 1. At its upper end each lever extends into and is operatively connected to the opposed pistons of the conventional hydraulic cylinder 95.

Centrally each lever 126 is formed with an enlarged aperture 131 shown in Figure 12 to prevent contact between the lever and the guide bolt 112 during rocking of the lever in operation.

In the assembly each lever 126 which is formed as by stamping a piece of flat steel stock has its flat under surface 132 in sliding contact with the flat guide faces on the backing plate which all lie substantially in the same plane. Thus lever 126 at the left in Figure 11 slides on faces 121, 109, 108 and 101 and is retained and slidably guided between the end of abutment plate 103 and face 101 as illustrated in Figures 11 and 15. Lever 126 at the right in Figure 11 slides on faces 122, 113', 113 and between face 102 and the abutment plate 103. The travel of levers 126 during operation of the brake is not sufficient to move out from under the abutment plate 103.

The brake shoes 133 are the same as in Figure 1, each comprising a flat web 134 and arcuate platform 135 carrying a bonded lining 136, with arcuate surfaces 137 at the ends of the web in rocking contact respectively with flat abutment faces 104 and 129. Each flat shoe web is formed with an enlarged aperture 138 that clears guide bolt 112 or 116. In the assembly as illustrated in Figure 12, shoe web 134 has its flat underside slidably associated with the flat upper side of lever 126, and a large washer 139 backed by a nut 140 threaded on bolts 112 or 116 coacts with the flat backing plate guide faces to slidably guide the shoe web and lever during brake operation while maintaining them against separation laterally of the assembly and thereby positively locating the brake lining surface squarely with the brake drum, and permitting relatively sliding displacement between them.

Each upper return spring 141 has one end hooked over notch 105 and its other end anchored in an opening 142 in the brake shoe web. Each lower return spring 143 is anchored at one end on a pin 118 and at its other end in opening 144 of the brake shoe web. A series of openings 145 are provided in levers 126 to clear them of contact with the springs during operation of the brake. The arrangement and functioning of the return springs is the same as in the Figure 1 embodiment. A line interconnecting each pair of openings 142 and 144 is located radially inwardly of a parallel line through guide bolt 112 or 116.

A cylindrical pressure pin 146 is rigidly secured to each lever 126 adjacent its center of action, as by riveting through lever holes 147. Each pin 146 peripherally contacts a shoe edge recess comprising a continuously curved concave surface 148 centrally of each shoe web 134. Surface 148 is preferably a circular arc of larger radius of curvature than pin 146 and it merges smoothly at opposite sides of its region of illustrated contact with pin 146 into straight faces 149 tangent to the arc 148. The relative diameters of the pressure pin and web arc are important. For example, with a three fourths inch diameter pin 146, the arc 148 should have a diameter approximately in the range of two to three inches and no smaller, for optimum operation.

The above described inner edge recess in each shoe web is symmetrical about a horizontal center line through the pressure pin in the relaxed position of the brake shown in Figure 11. Faces 149 could be lengthened to slightly shorten the arc 148 or could be slightly arcuate. An essential requirement is that pressure pin 146 engage a shoe web recess that substantially uniformly slopes from the central arc 148.

It is further important that the arc 148 should be located radially outward in the web 134 sufficiently far to be long enough to afford an adequate slope relationship for travel of the pressure pin. No matter how far pin 146 rides up a side of the arc 148 or beyond on straight edge 149 during movement of the floating shoe relative to the lever, the desired wedge or ramp effect should be obtained without frictional locking of the pin and shoe surface. Thus by providing uniformly changing surfaces of small slope on both sides of the normal region of contact of the pressure pin with the shoe web we insure against frictional binding. Each pin 146 could be a fixed pin mounting a ball, roller or journal bearing.

In the inoperative position of the parts shown in Figure 11, the return springs urge the shoes against the upper end lower abutments, and force is transmitted through the pressure pin to rock levers 126 to their illustrated retracted positions. In operation of the brake of Figures 11–20 fluid under pressure is introduced into cylinder 95 to displace the opposed pistons outwardly thereby oppositely rocking levers 126 about the lower abutments. Pressure pins 146 maintain contact with the brake shoe webs and thereby move the brake shoes substantially outwardly to apply linings 136 to the brake drum.

When linings 136 frictionally contact the brake drum surface floating brake shoes 133 shift circumferentially into solid contact with abutment faces 104 or 129 depending upon the direction of drum rotation. If the drum is rotating clockwise in Figure 11, shoe 133 at the left will shift in the same direction against stationary abutment face 104, and shoe 133 at the right will shift in the same direction against stationary abutment face 129. During this circumferential shift a sloping side or ramp of the edge recess on each shoe web will ride up on the associated pressure pin 146, thereby wedging the shoe outwardly and increasing braking energization of the shoe. Since the edge recesses of the shoe webs are uniform with respect to the region of contact between the pressure pin and shoe when the brake is in relaxed condition, this self-energization occurs in the same manner in both directions of drum rotation.

This ramp action also automatically compensates for lining-drum clearance and helps maintain minimum fluid and actuator travel requirements. The operator will find that brake pedal pressure may be increased with little or no further travel of the pedal.

When the brake pedal is released springs 141 and 143 immediately pull the shoes 133 away from the brake drum, and pressure pin 146 acting in each shoe web edge recess while the shoe is thus floating tends to center the shoe in the center of the web edge recess before the web ends contact both abutments 104 and 129.

There is hereby provided in a dual primary brake an arcuate recess and pressure pin connection between the actuating lever and the brake shoe web which is a slidable, rockable connection that tends to center a floating shoe, and provides a ramp or wedge effect to increase shoe energization and automatically compensate for lining-drum clearance with minimum fluid and/or actuator travel requirements. These features thereby provide a safer more reliable brake which requires less maintenance than prior brakes. The illustrated embodiments, except for the self-energizing connection of Figures 11–20, are generally alike and of interchangeable structure.

The invention may be embodied in other specific forms without departing from the spirit on essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an internally expanding brake, a rotatable wheel mounted drum, a backing plate, brake actuating levers fulcrumed at adjacent ends on said backing plate, a brake actuator operatively disposed between the other ends of said levers and mounted on said backing plate, fixed upper and lower brake shoe abutments on said backing plate, brake shoes each comprising an arcuate platform mounting a lining of friction material for engagement with said drum and having a web in slidable side-by-side engagement with the associated one of said levers, a slidable and rockable force transmitting connection between each said lever and associated brake shoe web comprising a rigid lateral projection on one of them engaging an arcuate surface on the other, and return springs between each shoe and the backing plate urging said shoes away from said drum against said abutments and maintaining said shoe webs and levers in operative engagement.

2. In an internally expanding brake for a rotatable wheel mounted drum, a backing plate, brake actuating levers fulcrumed at adjacent ends on said backing plate, a brake actuator operatively disposed between the other ends of said levers and mounted on said backing plate, upper and lower brake shoe abutments on said backing plate, brake shoes each comprising an arcuate platform mounting a lining of friction material for engaging said drum and having a web in slidable side-by-side engagement with the associated one of said levers, a slidable and rockable force transmitting connection between each said lever and associated web comprising a lateral projection secured to one of them having an arcuate peripheral surface engaging a symmetrical substantially concave edge recess in the other, and return springs between each shoe and the backing plate urging said shoes away from the drum into engagement with said abutments and maintaining said shoe webs and levers in operative engagement.

3. In an internally expanding brake, a rotatable wheel mounted drum, a backing plate, brake actuating levers fulcrumed at adjacent ends on said backing plate, a brake actuator operatively disposed between the other ends of said levers and mounted on said backing plate, upper and lower brake shoe abutments on said backing plate, brake shoes each comprising an arcuate platform mounting a lining of friction material for engaging said drum and having a web in slidable side-by-side engagement with the associated one of said levers, a slidable and rockable force transmitting connection between each said lever and associated web comprising a pressure pin on the lever engaging a substantially concave edge recess on said web, said recess comprising an arcuate center region surface in centering contact with said pressure pin when the brake actuator is deenergized and similarly inclined surfaces gradually sloping in opposite directions from said center region and constituting substantial continuations of said center region surface, and return springs between each shoe and the backing plate urging said shoes away from the drum against said abutments and maintaining said pressure pin and recess in operative engagement.

4. In combination in a vehicle brake, a rotatable drum, a support plate having an aperture and associated means whereby it may be attached to a vehicle axle, an opening in said plate spaced from said aperture, means mounting a hydraulic brake shoe actuating cylinder in said opening, a brake shoe abutment member rigidly secured upon one side of said plate between said aperture and opening and having oppositely inclined stationary brake shoe contact faces at opposite ends, an integral boss projecting from the surface of said plate substantially diametrically opposite said abutment member, oppositely extending longitudinally adjustable lower abutments projecting from said boss, said lower abutments having adjacent ends within said boss and accessible from the side of the brake opposite said drum, oppositely rockable levers pivoted at adjacent ends on said lower abutments and having their other ends connected to said actuating cylinder, lined brake shoes each extending between one of said lower boss abutments and a face of said abutment member, and means operatively interconnecting said brake actuating levers and brake shoes so that rocking of the levers by energization of said cylinder will displace the shoes outwardly until the lining contacts said drum.

5. In a vehicle brake assembly, a support plate having on one side thereof spaced flat integral guide surfaces lying substantially in a plane, means mounted on said plate forming upper and lower stationary brake shoe abutment surfaces, brake lever actuating means mounted on said plate, oppositely rockable brake levers operatively connected to said actuating means and fulcrumed on said lower abutment surfaces and having one side slidably engaging said guide surfaces, brake shoes having webs maintained in slidable contact with the other sides of said levers and opposite ends adapted to contact said abutment surfaces, means rockably and slidably connecting each lever with one of said shoes, and a plurality of resilient means interconnecting each of said brake shoes and said support plate for urging said shoes against said abutment surfaces and maintaining said operative connection between the levers and associated shoe webs.

6. In a vehicle brake assembly, an integral brake mechanism support plate having on one side a plurality of axially projecting bosses, brake lever guide surfaces on said bosses lying substantially in a plane, a lower abutment mounting boss formed in said plate and projecting in the same direction as said other bosses, said lower boss having bores in opposite end walls for adjustably supporting lower abutment members and the axes of said bores lying in a plane normal to the axis of said plate, an upper abutment support boss in said plate on the opposite side of the center of said plate from said lower abutment mounting boss, and an upper abutment member rigidly secured upon said upper boss and having oppositely inclined brake shoe abutment faces.

7. In the vehicle brake assembly defined in claim 6, lower brake shoe abutment members mounted in said bores on opposite ends of said boss and projecting at equal angles in opposite directions with respect to a diameter of said plate, the heads of said lower abutment members being outside the boss and the inner ends of said lower abutment members being inside the boss so as to be accessible for adjustment of said heads without entry to the other side of said plate.

8. In a vehicle brake assembly, a support plate having a plurality of flat guide surfaces lying substantially in a plane, a pair of brake levers slidable on one side over said guide surfaces and independently fulcrumed at adjacent ends, an actuator connecting said levers at their other ends, brake shoes, one for each lever, having webs slidably engaging the other sides of said levers, means retaining each lever and shoe pair in relatively slidable assembly on said plate, a rigid lateral projection on each said lever having a slidable and rockable connection with an arcuate edge surface of the associated brake shoe intermediate the ends of both, stationary abutments on said plate for engaging opposite ends of said shoes, and return springs anchored at opposite ends to said support plate and said shoes opposing said actuator and urging said shoes against said abutments.

9. In a brake, a support, spaced stationary abutments on said support, a pair of brake levers mounted for independent rockable abutment with a pair of the said spaced abutments at adjacent ends on said support, brake shoes having arcuate edge surfaces; rockably and slidably engageable with rigid projections on said levers and capable of slight circumferential shift between coacting abutments, an actuator interconnecting the other ends of said levers, and resilient means between the shoes and support opposing said actuator and urging said shoes toward said abutments.

10. In a brake assembly, a support having a flat guide surface, a flat lever fulcrumed at one end and connected to an actuator at the other end, one side of said lever being slidable on said surface, a brake shoe having a web with a flat side slidable on the other side of said lever, means mounted on said support engaging the other side of said brake web and coacting with said support guide surface for retaining said lever and shoe in transverse assembly but permitting their relative slidable movement, a rigid projection on said other side of said lever having rocking sliding engagement with an arcuate edge region of said shoe web, and upper and lower return springs connecting said shoe with said support and urging said shoe against said abutments in the relaxed position of the brake parts.

11. In a brake, a support, a plurality of brake shoe and lever assemblies independently pivoted on said support at adjacent ends, an actuator interconnecting the other ends of said assemblies for oppositely rocking said levers, and a plurality of return springs opposing said actuator comprising two pairs of angularly related springs anchored at their inner adjacent ends to said support and connected at their outer ends to said shoes, each pair being located on opposite sides of a diameter, a motion transmitting connection between said levers and said shoes intermediate the ends of both, and the springs of each pair intersecting a common diameter.

12. In a brake assembly, a support having a flat guide surface, a flat lever member having one side slidable on said surface, a stationary abutment mounted on said support and upon which one end of said lever is fulcrumed, a spaced stationary abutment on said support, a brake shoe member having a web with a flat side slidable on the other side of said lever and having opposite ends adapted to contact said abutments, a rigid lateral projection on one of said members having rockable and slidable connection with an arcuate edge face on the other of said members, spring means between the shoe member and support maintaining said connection and urging said brake shoe into contact with said abutments, and means on the support coacting with said guide surface maintaining said shoe and lever in transverse assembly while permitting relative sliding movement thereof.

13. In the brake assembly defined in claim 12, means for adjusting said spaced abutment in a line, and said spring means including a coil spring between the brake shoe and the support whose line of action is substantially coincident with said line of adjustment whereby said abutment connection is maintained tight with all adjustments.

14. In a brake assembly, a lever member pivoted at one end and connected to an actuator at the other end, circumferentially spaced stationary brake shoe abutments, a brake shoe member mounted for floating movement on said lever and between said abutments, spring means urging said shoe into contact with said abutments against the action of said actuator, and a rocking sliding force transmitting connection between said members comprising a lateral projection rigid with one member maintained in direct contact with rigid arcuate edge of the other member by said spring means.

15. In a vehicle brake assembly, a support, a pair of oppositely rockable levers on said support, an actuator disposed between adjacent free ends of said levers, a pair of brake shoes, means rockably and slidably connecting said shoes to said levers permitting circumferential sliding of said shoes on said levers, circumferentially spaced stationary abutments on said support adapted to abut opposite ends of said brake shoes, certain of said abutments being adapted to pivotally support the other ends of said levers, and a plurality of return springs anchored at opposite ends on said support and one of said brake shoes, each spring having a line of action approximating the direction of the braking forces on said abutments.

16. In combination in a vehicle brake, a support plate having an aperture and associated means whereby it may be attached to a vehicle axle, an opening in said plate spaced from said aperture and adapted for mounting a hydraulic brake shoe actuating cylinder, a brake shoe abutment member rigidly secured upon one side of said plate between said aperture and opening, oppositely inclined brake shoe abutment faces on opposite ends of said abutment member, and an integral brake actuating lever pivot mounting boss projecting from the surface of said plate at the same side of the plate as said abutment member but disposed substantially diametrically opposite said abutment member.

17. In the combination defined in claim 16, internally threaded bores in opposite ends of said boss having axes lying in a plane normal to the axis of said aperture and extending at equal angles in opposite directions with respect to a diameter of said plate.

18. In an internally expanding brake, a rotatable wheel mounted drum, a support, spaced brake shoe abutments on said support, levers pivoted at adjacent ends on said support, brake shoes adapted for engagement with said drum and mounted for circumferential float between said abutments, resilient means urging said shoes away from said brake drum and against said abutments, means providing a rocking and sliding force transmitting connection between each said lever and associated shoe, and means in each said connection operative upon engagement of the brake shoe with the drum for causing the resultant circumferential shift of the shoe to automatically increase the pressure of the shoe against the drum for either direction of rotation of the drum.

19. In an internally expanding brake for a rotatable wheel mounted drum, a support, spaced brake shoe abutments on said support, levers pivoted at adjacent ends on said support, brake shoes adapted for engagement with said drum and mounted for circumferential float between said abutments, resilient means urging said shoes away from said brake drum and against said abutments, means providing a rocking and sliding force transmitting connection between each said lever and associated shoe, and means in each said connection operative upon engagement of the brake shoe with the drum for causing the resultant circumferential shift of the shoe to automatically increase the pressure of the shoe against the drum in either direction of rotation of the drum comprising a rigid lateral projection on the lever having an arcuate surface maintained in contact with a substantially concave recess on the brake shoe by said resilient means, said recess comprising an arcuate surface portion normally in contact with said arcuate pin surface when the brake is not actuated and gradually sloping ramp surfaces on opposite ends of said arcuate surface portion.

20. In an internally expanding brake for a rotatable wheel mounted drum, a support, spaced brake shoe abutments on said support, levers pivoted at adjacent ends on said support, brake shoes adapted for engagement with said drum and mounted for circumferential float between said abutments, resilient means urging said shoes away from said brake drum and against said abutments, means providing a rocking sliding force transmitting connection between each said lever and associated shoe, and means in each said connection operative upon engagement of the brake shoe with the drum for causing the resultant circumferential shift of the shoe to automatically increase the pressure of the shoe against the drum in either direction of rotation of the drum comprising a rigid cylindrical pressure pin on the lever biased by said resilient means into contact with a substantially concave edge recess in the shoe, said recess comprising an arcuate surface portion of materially greater radius of curvature than the surface of said pin and gradually sloping ramp surfaces on opposite sides of said arcuate portion.

21. In a brake assembly, an actuating lever fulcrumed at one end, spaced brake shoe abutments, a brake shoe having a web slidably engaged with said lever and an operative self energizing force transmitting connection between said shoe and lever comprising a pressure pin rigid with the lever having an arcuate peripheral surface in contact with a symmetrical substantially concave edge recess having an arcuate center section and diverging opposite sides of small slope comprising substantial continuations of said center section.

22. In a brake assembly, a lever, a longitudinally adjustable abutment member having a surface on which one end of said lever is pivoted, an actuator operatively connected to the other end of said lever to rock the latter about its pivot on said surface, a fixed abutment surface near said actuator, a brake shoe having opposite end portions adapted to contact said abutment surfaces, means rockably and slidably connecting said lever and shoe including an arcuate face on one and a rigid projection on the other in contact with said face, and means resiliently urging said brake shoe toward said abutments and maintaining said one end of the lever against the adjustable abutment surface.

23. In the brake assembly defined in claim 22, said adjustable abutment member comprising a screw having a flat end providing the adjustable abutment surface.

24. In a brake assembly, an actuating lever fulcrumed at one end, spaced brake shoe abutments, a brake shoe unit having a platform on which a lining is mounted and a web formed with an edge recess that faces away from the platform and is centered with respect to said shoe unit, the central portion of said recess being a circular arc, a pressure pin rigid with said lever adapted to contact said recess, and means resiliently urging said brake shoe toward contact with said abutments and against said pressure pin, said pin and recess cooperating to center said shoe in the assembly.

25. In combination in a vehicle brake assembly, an integral brake mechanism support comprising an annular support plate, a pair of axially projecting diametrically opposed bosses on one face of said plate having brake lever guide surfaces thereon, a pair of additional bosses on said face on the same side of the diameter connecting said opposed bosses having additional brake lever guide surfaces thereon, all said guide surfaces lying substantially in a plane, a brake actuator mounting boss on said face circumferentially between said additional bosses, an upper abutment mounting boss circumferentially between said additional bosses and radially inward of said brake actuator mounting boss, and a lower abutment mounting boss on said face, diametrically opposite said upper abutment mounting boss and extending axially beyond said plane.

26. In the combination defined in claim 25, a flat plate rigidly secured to said upper abutment mounting boss having oppositely inclined abutment faces at each end, longitudinally adjustable lower abutments projecting from said lower abutment mounting boss, flat-sided brake levers having one side slidably disposed on said guide surfaces and having adjacent ends fulcrumed on said lower abutments, brake actuator means secured on said brake actuator mounting boss and connected to the opposite ends of said levers, brake shoes having flat-sided webs disposed in face to face relation with the other side of said levers, means for maintaining said face to face relation while permitting rocking and sliding movement of said brake shoes relative to said levers, a pair of springs for urging each of said brake shoes into contact with said abutments and abutment faces, said springs each having one end secured to said plate and the other end to a brake shoe, and each having a line of action approximating the direction of braking forces on said abutments and abutment faces, arcuate surfaces on said brake shoe webs substantially midway between the ends of the brake shoe, and a lateral projection on each said lever adapted rockably and slidably to contact said arcuate surface when said levers are actuated by said actuator.

References Cited in the file of this patent

UNITED STATES PATENTS

| | | |
|---|---|---|
| 2,124,785 | La Brie | July 26, 1938 |
| 2,133,669 | Pratt et al. | Oct. 18, 1938 |
| 2,234,257 | Karst et al. | Mar. 11, 1941 |
| 2,271,815 | Cowell | Feb. 3, 1942 |
| 2,381,655 | Edmonds | Aug. 7, 1945 |
| 2,389,311 | Hirschman et al. | Nov. 20, 1945 |
| 2,432,983 | Buckendale et al. | Dec. 23, 1947 |
| 2,435,955 | Buckendale et al. | Feb. 17, 1948 |
| 2,496,562 | Schnell | Feb. 7, 1950 |
| 2,560,551 | Buckendale | July 17, 1951 |